United States Patent
Wulff et al.

(10) Patent No.: US 6,890,653 B2
(45) Date of Patent: May 10, 2005

(54) MICROCAPSULE DISPERSION

(75) Inventors: Dirk Wulff, Schifferstadt (DE);
Ekkehard Jahns, Weinheim (DE);
Volker Schehlmann, Schopfheim (DE)

(73) Assignee: BASF Aktiengesellschaft,
Ludwigshafen (DE)

( * ) Notice: Subject to any disclaimer, the term of this patent is extended or adjusted under 35 U.S.C. 154(b) by 0 days.

(21) Appl. No.: 10/485,266

(22) PCT Filed: Aug. 6, 2002

(86) PCT No.: PCT/EP02/08739

§ 371 (c)(1),
(2), (4) Date: Feb. 10, 2004

(87) PCT Pub. No.: WO03/015910

PCT Pub. Date: Feb. 27, 2003

(65) Prior Publication Data

US 2004/0232575 A1 Nov. 25, 2004

(30) Foreign Application Priority Data

Aug. 15, 2001 (DE) .......................... 101 38 996

(51) Int. Cl.$^7$ .............................. B32B 5/16; B01J 13/02
(52) U.S. Cl. ............................ 428/402.21; 428/402.24; 428/403; 428/407; 264/4.1; 264/4.3; 264/4.33; 264/4.7; 524/801
(58) Field of Search .................. 428/402.21, 402.24, 428/403, 407; 264/4.1, 4.3, 4.33, 4.7; 524/801

(56) References Cited

U.S. PATENT DOCUMENTS

| | | | |
|---|---|---|---|
| 5,783,520 A | 7/1998 | Anderson et al. |
| 5,859,075 A | 1/1999 | Sivaram et al. |
| 5,911,923 A | 6/1999 | Hart et al. |

FOREIGN PATENT DOCUMENTS

| | | |
|---|---|---|
| DE | 101 20 480 | 10/2002 |
| EP | 0 026 914 | 4/1981 |
| EP | 148 169 | 7/1985 |
| EP | 0 148 169 | 7/1985 |
| EP | 407 257 | 1/1991 |
| EP | 0 407 257 | 1/1991 |
| EP | 0 535 384 | 4/1993 |

*Primary Examiner*—Samuel A. Acquah
(74) *Attorney, Agent, or Firm*—Oblon, Spivak, McClelland, Maier & Neustadt, P.C.

(57) ABSTRACT

The present invention relates to microcapsule dispersions comprising microcapsules having a capsule core comprising water-soluble organic substances, and a capsule coating which essentially consists of polyurethane and/or polyurea, in a hydrophobic solvent which consists of 50 to 100% by weight of glycerol ester oils and 0 to 50% by weight of solvents miscible with glycerol ester oils, and to a process for their preparation.

9 Claims, No Drawings

MICROCAPSULE DISPERSION

The present invention relates to microcapsule dispersions comprising microcapsules having a capsule core comprising water-soluble organic substances, and a capsule coating which essentially consists of polyurethane and/or polyurea, in a hydrophobic solvent which consists of 50 to 100% by weight of glycerol ester oils and 0 to 50% by weight of solvents miscible with glycerol ester oils, and to a process for their preparation.

Microcapsules are spherical particles which comprise a capsule core and a capsule coating surrounding the capsule core, also referred to as a capsule wall. Various uses are possible depending on the nature of the capsule core. A decisive factor here for the properties is also the wall material and the encapsulation process, for example in the case of capsules with controlled active ingredient release.

Microcapsules are used widely in carbon-free copy papers. Thus, microcapsules containing core oils comprising color formers have been known for a long time. The capsule walls based on melamine-formaldehyde resin (EP-A-0 026 914) or based on polyurea (EP-A-0 535 384) are formed by polycondensation or polyaddition at the interfaces of an oil-in-water emulsion.

In contrast to the oil-in-water emulsions in which the oil is the disperse, i.e. the discontinuous, phase, and the water is the continuous phase, encapsulation processes in which the two phases are reversed are also known. These processes are also referred to as inverse microencapsulation.

The earlier German application 10120480.2 describes such an inverse encapsulation. It teaches microcapsules having a capsule core comprising water-soluble substances and a capsule wall made of melamine-formaldehyde resins.

In addition, U.S. Pat. No. 5,859,075 teaches microcapsules having diols and polyols as capsule core and a polyurethane wall which are prepared in paraffins as the continuous phase. The resulting microcapsules are suitable as powder lacquer component. According to this teaching, water-sensitive substances can also be encapsulated by this process.

EP-A-0 148 169 describes microcapsules having a water-soluble core and a polyurethane wall which are prepared in a vegetable oil. As well as herbicides, water-soluble dyes are mentioned inter alia as capsule core material.

In decorative cosmetics, organic or inorganic pigments are usually used as color-imparting constituents. As a result of their insolubility, the pigments behave largely inertly toward the other constituents of the cosmetic composition, in contrast to soluble dyes. In addition, the insolubility of the pigments has the advantage that a lasting coloration of the sites within the body which have been treated with the cosmetic composition can be avoided.

However, a disadvantage of using pigment is their low color brilliance compared with dyes.

It is an object of the present invention to provide organic, water-soluble substances, such as dyes, for cosmetic compositions in a form in which they behave inertly toward solvents.

We have found that this object is achieved by the above-described microcapsule dispersions and a process for their preparation.

The capsules comprise a capsule coating and a capsule core. The capsule core comprises at least one water-soluble, organic substance as solid and/or, depending on the preparation, as a solution in the hydrophilic solvent. Preferred capsule cores are solutions of the water-soluble, organic substance.

For the purposes of this application, reactant is to be understood as meaning an OH or $NH_2$ group-carrying compound which reacts with di- and/or polyisocyanate groups.

The basic principle of microcapsulation is based on interfacial polymerization or addition. During interfacial addition, the substances to be encapsulated and the reactant are dissolved in a hydrophilic solvent in a first process step, and then a hydrophobic solvent is added, and the mixture is processed to give an emulsion. The continuous phase of the emulsion usually comprises surface-active substances in order to avoid coalescence of the droplets. In this emulsion, the hydrophilic solvent is the discontinuous, later disperse, phase and the hydrophobic solvent is the continuous phase. If the hydrophilic solvent is water, the term water-in-oil emulsion is also appropriate. The emulsified droplets have a size which corresponds approximately to the size of the later microcapsules. To form the capsule wall, the emulsion is mixed with the isocyanate capable of wall formation in a second process step. The reactant is able to react at the interface between the discontinuous and the continuous phase with the isocyanate dissolved in the continuous phase to form the polymeric film.

The third process step involves the after-treatment of the freshly prepared capsule dispersion. Here, with monitoring of temperature and residence time and optionally using further auxiliaries, the reaction between isocyanate and reactant is ended.

A hydrophilic solvent is to be understood as meaning either water or those aqueous mixtures which, apart from water, comprise up to 20% by weight of a water-miscible organic solvent, such as $C_1$–$C_4$-alkanols, in particular methanol, ethanol, isopropanol or a cyclic ether, such as tetrahydrofuran. A preferred hydrophilic solvent is water.

Suitable hydrophilic solvents are also ethylene glycol, glycerol, polyethylene glycols and butylene glycol, their mixtures, and their mixtures with water or the aqueous mixtures listed above. Preferred hydrophilic solvents are mixtures of these solvents with water.

According to the invention, pure glycerol ester oils or 50 to <100% strength by weight glycerol ester oil mixtures are used as hydrophobic solvent. Glycerol ester oils are to be understood as meaning esters of saturated or unsaturated fatty acids with glycerol. Mono-, di- and triglycerides, and their mixtures, are suitable. Preference is given to fatty acid triglycerides.

Examples of fatty acids which may be mentioned are $C_6$–$C_{12}$-fatty acids, such as hexanoic, octanoic, decanoic and dodecanoic acid.

Preferred glycerol ester oils are $C_6$–$C_{12}$-fatty acid triglycerides, in particular octanoic and decanoic triglycerides, and their mixtures. Such an octanoyl glyceride/decanoyl glyceride mixture is, for example, Miglyol® 812 from Hüls.

The hydrophobic solvent consists of 50 to 100% by weight, preferably 70 to 100% by weight, particularly preferably. 90 to 100% by weight, of glycerol ester oils and 0 to 50% by weight, preferably 0 to 30% by weight, particularly preferably 0 to 10% by weight, of solvents which are miscible with glycerol ester oils. Particularly preferred hydrophobic solvents are glycerol ester oils, which are used individually or in their mixtures.

Examples of oils which are miscible with glycerol ester oils are:

hydrocarbon oils, such as paraffin oil, purcellin oil, perhydrosqualene and solutions of microcrystalline waxes in these oils, animal or vegetable oils, such as sweet almond oil, avocado oil, calophylum oil, lanolin and derivatives thereof, castor oil, horse oil, pig oil, sesame oil, olive oil, jojoba oil, carité oil, hoplostethus oil, mineral oils whose distillation start-point under atmospheric pressure is at about 250° C. and whose distillation end-point is at 410° C., such as, for example, vaseline oil, esters of saturated or unsaturated fatty acids, such as alkyl myristates, e.g. isopropyl myristate, butyl myristate or cetyl myristate, hexadecyl stearate, ethyl or isopropyl palmitate and cetyl ricinolate.

Further suitable compounds which are miscible with glycerol ester oils are silicone oils, such as dimethylpolysiloxane, methylphenylpolysiloxane and the silicone glycol copolymer, fatty acids and fatty alcohols or waxes, such as carnauba wax, candellila wax, beeswax, microcrystalline wax, ozokerite wax and Ca, Mg and Al oleates, myristates, linoleates and stearates.

A water-soluble, organic substance is to be understood as meaning a compound based on carbon which is at least partially soluble in water. The organic substance must have a greater affinity to the hydrophilic phase than to the hydrophobic phase. This is generally ensured if the substance has a solubility in the hydrophilic solvent at room temperature of at least 1 g/l. The organic substances preferably have a solubility in the hydrophilic solvent of $\geq 20$ g/l.

The water-soluble, organic substances are, for example, water-soluble dyes, agrochemicals, flavorings, pharmaceutical active ingredients, fertilizers or cosmetic active ingredients. Depending on the thickness of the capsule wall, which is influenced by the chosen process conditions and the amount of feed substances, the capsules are impermeable or virtually impermeable for the water-soluble, organic substances. With virtually impermeable capsules, controlled release of water-soluble, organic substances can be achieved. Preference is given to water-soluble dyes.

The term "dye" includes here and below organic compounds or salts of organic compounds, and charge transfer complexes of organic compounds containing a chromophore which has an absorption maximum in the wavelength range from 400 to 850 nm and thus gives rise to a color impression for the human eye (conventional dyes) and which itself may also emit light in the visible region (fluorescent dyes). For the purposes of this invention, dyes are also compounds with an absorption maximum in the range from 250 to 400 nm which, upon irradiation with UV light, emit fluorescent radiation in the visible region (optical brighteners). For the purposes of this invention, dyes are also organic compounds which absorb light of wavelength <400 nm and deactivate it in a nonradiative manner (UV stabilizers).

The water-soluble dyes usually have ionic functional groups which improve the solubility in the aqueous solvent. In this connection, the modification can be carried out cationically or anionically. Suitable substituents are, for example, sulfonic acid, carboxylic acid, phosphoric acid radicals, and also ammonium-and alkylammonium radicals.

Dyes suitable according to the invention include a variety of classes of dyes having various chromophores, for example monoazo and disazo dyes, triarylmethane dyes, metal complex dyes, such as phthalocyanine dyes, quinophthalones and methine and azamethine dyes.

By way of example, reference may be made to the following Colour Index numbers:

Direct Yellow 4, 5, 11, 50, 127, 137, 147, 153; Acid Orange 7, 8; Direct Orange 15, 34, 102; Direct Red 81, 239, 252–255; Direct Violet 9, 51; Acid Blue 9, 86; Direct Blue 199, 218, 267, 273, 279, 281; Acid Black 194, 208, 210, 221; Direct Black 19, 161, 170 and 171;

Basic Red 1, Basic Red 14, Basic Blue 7, Basic Blue 11, Basic Blue 26, Basic Violet 1, Basic Violet 4, Basic Violet 10 etc; reactive dyes such as Reactive Red 120, Reactive Red 2 etc.

The dyes also include complexes of basic and acidic dyes and complexes of anionic and cationic dyes, for example the complex of chrysoidine base and metanil yellow acid.

According to the invention, the dyes also include optical brighteners which are at least partially soluble in water.

In accordance with the definition, the organic dyes also include UV-ray-absorbing compounds (UV stabilizers) which deactivate the absorbed radiation in a nonradiative manner. Such compounds are frequently used as UV absorbers in sunscreen compositions. These include derivatives of p-aminobenzoic acid, in particular its esters; salicylates, cinnamates, benzophenones, 2-phenylbenzimidazole-4-sulfonic acid and salts thereof, urocanic acid, salts thereof and esters thereof, benzoxazoles, benzotriazoles, benzylidenecamphor and its derivatives.

Also highly suitable are Colour Index dyes used in cosmetics, such as 42045, 42051, 42080, 42090, 42735, 44045, 61585, 62045, 73015, 74180, bromothymol blue, caramel, 10316, 13015, 18690, 18820, 18965, 19140, 45350, 47005, 75100, lactoflavin, 10020, 42053, 42100, 42170, 44090, 59040, 61570, 75810, bromocresol green, 14270, 15510, 15980, 15985, 16230, 20170, 40215, 14700, 14720, 14815, 15620, 16035, 16185, 16255, 16290, 17200, 18050, 18130, 18736, 24790, 27290, 45100, 45220, 45380, 45405, 45410, 45425, 45430, 75470, beetroot red, anthocyans, acid red 195, black 20470, 27755, 28440, 50420, 42510, 42520, 45190 and 60730.

Depending on the color intensity of the dye, the microcapsule usually comprises at least 0.1% by weight, based on the hydrophilic solvent, preferably 1 to 50% by weight and in particular 5 to 20% by weight, of at least one dye.

The capsule wall according to the invention consists essentially of polyurethane and/or polyurea. Preference is given to capsule walls which essentially consist of polyurea, i.e. reaction products of $NH_2$ group-containing reactants with di- and/or polyisocyanates.

Also suitable are di- and polyisocyanates, such as aliphatic, cycloaliphatic, araliphatic, aromatic and heterocyclic di- and polyisocyanates, as are described by W. Siefken in Justus Liebigs Annalen der Chemie, 562, pages 75 to 136, for example ethylene diisocyanate, 1,4-tetramethylene diisocyanate, 1,6-hexamethylene diisocyanate, 1,12-dodecane diisocyanate, cyclobutane 1,3-diisocyanate, cyclohexane 1,3- and 1,4-diisocyanate and any mixtures of these isomers, 1-isocyanato-3,3,5-trimethyl-5-isocyanatomethylcyclohexane, as described, for example, in DE-B 1 202 785 and U.S. Pat. No. 3,401,190, 2,4- and 2,6-hexane-hydrotolylene diisocyanate, and any mixtures of these isomers, hexahydro-1,3- and -1,4-phenylene diisocyanate, perhydro-1,4'- and -4,4'-diphenylmethane diisocyanate, 1,3- and 1,4-phenylene diisocyanate, 2,4- and 2,6-tolylene diisocyanate, and any mixtures of these isomers, diphenylmethane 2,4'- and 4,4'-diisocyanate, naphthylene 1,5-diisocyanate, triphenylmethane 4,4',4"-triisocyanate, polyphenylpolymethylene polyisocyanates, as obtained by aniline-formaldehyde condensation and subsequent phosgenation and are described, for example, in GB patents 874 430 and 848 671, m- and p-isocyanatophenylsulfonyl isocyanates according to U.S. Pat. No. 3,454,606, perchlorinated aryl polyisocyanates, as are described, for example, in DE-B 1 157 601, polyisocyanates having carbodiimide groups, as are described in DE patent 1 092 007 (=U.S. Pat. No. 3,152,162), diisocyanates as described in U.S. Pat. No. 3,492,330, polyisocyanates having allophanate groups, as are described in GB patent 761 626 and the published NL patent application 7 102 524, polyisocyanates having isocyanurate groups, as described, for example, in U.S. Pat. No. 3,001,973, in the German patents 1 022 789, 1 222 067 and 1 027 394, and in German laid-open patents 1 929 034 and 2 004 048, polyisocyanates having urethane groups, as described, for example, in BE patent 752 261 or in U.S. Pat. No. 3,394,164, polyisocyanates having acylated urea groups according to German patent 1 230 778, polyisocyanates having biuret groups, as described, for example, in German patent 1 101 394 and in GB patent 889 050, polyisocyanates prepared by telomerization reactions, as are described, for example, in U.S. Pat. No. 3,654,106, polyisocyanates having ether groups, as are mentioned, for example, in GB patents 965 474 and 1 072 956, in U.S. Pat. No. 3,567,763 and in German patent 1 231 688, reaction products of the abovementioned isocyanates with acetals according to German patent 1 072 385 and polyisocyanates containing polymeric fatty acid radicals in accordance with U.S. Pat. No. 3,455,883.

It is also possible to use the distillation residues having isocyanate groups which form during the industrial preparation of isocyanate, optionally dissolved in one or more of the abovementioned polyisocyanates. It is also possible to use any mixtures of the abovementioned polyisocyanates.

Suitable modified, aliphatic isocyanates are, for example, those based on hexamethylene 1,6-diisocyanate, m-xylylene diisocyanate, 4,4'-diisocyanate dicyclohexylmethane and isophorone diisocyanate, which have at least two isocyanate groups per molecule.

Also suitable are, for example, polyisocyanates based on derivatives of hexamethylene 1,6-diisocyanate with a biuret structure as described in DE-B 1 101 394, DE-B 1 453 543, DE-A 1 568 017 and DE-A 1 931 055.

It is also possible to use polyisocyanate-polyuretoneimines, as arise as a result of the carbodiimidization of hexamethylene 1,6-diisocyanate containing biuret groups with organophosphorus catalysts, where primarily formed carbodiimide groups react with further isocyanate groups to give uretoneimine groups.

It is also possible to use isocyanurate-modified polyisocyanates having more than two terminal isocyanate groups, e.g. those whose preparation on the basis of hexamethylene diisocyanate is described in DE-A 2 839 133. Other isocyanurate-modified polyisocyanates can be obtained analogously thereto.

It is also possible to use mixtures of said isocyanates, e.g. mixtures of aliphatic isocyanates, mixtures of aromatic isocyanates, mixtures of aliphatic and aromatic isocyanates, in particular mixtures which optionally comprise modified diphenylmethane diisocyanates.

The di- and/or polyisocyanates described here can also be used as mixtures with di- and polycarbonyl chlorides, such as sebacoyl chloride, terephthaloyl chloride, adipoyl dichloride, oxaloyl dichloride, tricarballyloyl trichloride and 1,2,4,5-benzenecarbonyl tetrachloride, with di- and polysulfonyl chlorides, such as 1,3-benzenesulfonyl dichloride and 1,3,5-benzenesulfonyl trichloride, phosgene and with dichloro- and polychloroformic esters, such as 1,3,5-benzene trichloroformate and ethylene bischloroformate.

Preferred isocyanates are biuretic hexamethylene diisocyanate, optionally in a mixture with 4,4'-diphenylmethane isocyanate and optionally 2,4-diphenylmethane isocyanate, trimerized hexamethylene diisocyanate optionally in a mixture with 4,4'diphenylmethane diisocyanat and optionally 2,4-diphenylmethane diisocyanate.

Further preferred diisocyanates are the alkylbenzene diisocyanates and alkoxybenzene diisocyanates given in DE-A 3 105 776 and 3 521 126, including those in the form of their biuret isocyanate uretdione oligomers.

Preferred di- or polyisocyanates are 4,4'-diphenylmethane diisocyanate, the mixtures of monomeric diphenylmethane diisocyanates and oligomeric diphenylmethane diisocyanates (polymer MDI), tetramethylene diisocyanate, tetramethylene diisocyanate trimers, hexamethylene diisocyanate, hexamethylene diisocyanate trimers, isophorone diisocyanate trimer, 4,4'-methylenebis(cyclohexyl) diisocyanate, xylylene diisocyanate, tetramethylxylylene diisocyanate, dodecyl diisocyanate, lysine alkyl ester diisocyanate, where alkyl is $C_1$ to $C_{10}$, 2,2,4- or 2,4,4-trimethyl-1,6-hexamethylene diisocyanate, 2-butyl-2-ethylpentamethylene diisocyanate, 1,4-diisocyanatocyclohexane or 4-isocyanatomethyl-1,8-octamethylene diisocyanate.

Particular preference is given to di- or polyisocyanates having NCO groups of varying reactivity, such as 2,4-tolylene diisocyanate (2,4-TDI), 2,4'-diphenylmethane diisocyanate (2,4'-MDI), triisocyanatotoluene, isophorone diisocyanate (IPDI), 2-butyl-2-ethylpentamethylene diisocyanate, 2-isocyanatopropylcyclohexyl isocyanate, 3(4)-isocyanatomethyl-1-methylcyclohexyl isocyanate, 1,4-diisocyanato-4-methylpentane, 2,4'-methylenebis(cyclohexyl) diisocyanate and 4-methylcyclohexane 1,3-diisocyanate (H-TDI). Particular preference is also given to isocyanates whose NCO groups are initially equally reactive, but in which a reactivity decrease in the case of the second NCO group can be induced as a result of the first addition of an alcohol or amine onto an NCO group. Examples thereof are isocyanates whose NCO groups are coupled via a delocalized electron system, e.g. 1,3- and 1,4-phenylene diisocyanate, 1,5-naphthylene diisocyanate, diphenyl diisocyanate, tolidine diisocyanate or 2,6-tolylene diisocyanate.

In addition, it is possible to use, for example, oligo- or polyisocyanates which can be prepared from said di- or polyisocyanates or mixtures thereof by linking by means of urethane, allophanate, urea, biuret, uretdione, amide, isocyanurate, carbodiimide, uretonimine, oxadiazinetrione or iminooxadiazinedione structures.

$NH_2$-containing reactants according to the invention are: hydrazine, guanidine and salts thereof, hydroxylamine, di- and polyamines and aminoalcohols. These compounds can be used in pure form or as mixtures with one another. A preferred guanidine salt is guanidine carbonate. If guanidine salts of strong acids are used, the addition of a base is required.

Suitable amines are generally polyfunctional amines in the molecular weight range from 32 to 500 g/mol, preferably from 60 to 300 g/mol, which contain at least two amino groups chosen from the group of primary and secondary amino groups. Examples thereof are diamines, such as diaminoethane, diaminopropanes, diaminobutanes, diaminohexanes, piperazine, 2,5-dimethyl-piperazine, amino-3-aminomethyl-3,5,5-trimethylcyclohexane (isophoronediamine, IPDA), 4,4'-diaminodicyclohexylmethane, 1,4-diaminocyclohexane, aminoethylethanolamine, hydrazine, hydrazine hydrate or triamines such as diethylenetriamine or 1,8-diamino-4-aminomethyloctane.

The amines can also be used in blocked form, e.g. in the form of the corresponding ketimines (see e.g. CA-A-1 129 128), ketazines (cf. e.g. U.S. Pat. No. 4,269,748) or amine salts (see U.S. Pat. No. 4,292,226).

Examples of aminoalcohols are ethanolamine and triethanolamine. In principle, water can also act as reactant by, as a result of addition onto an NCO group and subsequent $CO_2$ elimination, generating an amino group which can then react with an NCO group with crosslinking.

Preferred $NH_2$-carrying reactants are diamines, particularly preferably aliphatic $C_2$–$C_6$-diamines, such as ethylenediamine and hexamethylenediamine.

The amount of isocyanates to be used according to the invention varies within the scope customary for interfacial polyaddition processes. Thus, 20 to 150% by weight, preferably 40 to 150% by weight, of isocyanate are used based on the discontinuous phase provided for the encapsulation (hydrophilic solvent+water-soluble substance). Good shear stabilities of the capsules can be observed from amounts as low as 40% by weight. Amounts above 150% by weight are possible, but do not generally lead to more stable capsule walls.

The theoretical amount of the reactants necessary for wall formation is calculated from a) the content of reactive amino and/or hydroxyl groups of the reactant component used. These quantitative ratios are usually expressed by equivalent weights.

$$\text{Equivalent } weight_{isocyanate} = \frac{42}{NCO \text{ content}*} \times 100$$

$*) = $ e.g. to be determined titrimetrically $(DIN\ 53\ 185)$ $$\text{Equivalent } weight_{reactant} = \frac{\text{molecular } weight_{reactant}}{\text{number of reactive groups in the moelcule}}$$

Reaction of all of the NCO groups present in the oil phase requires at least the theoretically equal number of $NH_2$ and/or OH groups. It is therefore advantageous to use the isocyanate and the reactant in the ratio of their equivalent weights. It is, however, likewise possible to deviate from the stoichiometrically calculated amount of reactant either downward since, during interfacial polyaddition processes, a secondary reaction of the isocyanate with the water present in excess cannot be ruled out, or to use an excess of the reactant component because such an excess is uncritical.

In particular, therefore, the reactants are used in an amount between 50 and 150% by weight of the theoretically calculated amount. This amount is preferably between 50 and 100% by weight, based on the theoretically calculated amount.

The present invention further provides a process for the preparation of the microcapsule dispersion according to the invention, which comprises preparing an emulsion of the hydrophilic solvent in the-hydrophobic solvent using a surface-active substance, where the hydrophilic phase comprises the water-soluble organic substance and the OH or $NH_2$ group-carrying reactants which react with di- and/or polyisocyanate groups, and adding di- and/or polyisocyanates to the emulsion.

In order to obtain a stable emulsion, surface-active substances, such as protective colloids and/or emulsifiers, are required. Usually, surface-active substances which mix with the hydrophobic phase are used.

Preferred protective colloids are linear block copolymers with a hydrophobic structural unit of length $\geq 50$ Å, alone or in mixtures with other surface-active substances. The linear block copolymers are given by the formula

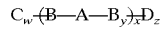

in which w is 0 or 1, x is 1 or more, y is 0 or 1 and A is a hydrophilic structural unit, having a solubility in water at 25° C. of $\geq 1\%$ by weight (>10 g/l) and a molecular weight of from 200 to 50 000, which is bonded covalently to the B blocks, and B is a hydrophobic structural unit having a molecular weight of from 300 to 60 000 and a solubility in water at 25° C. of <1% by weight and can form covalent bonds to A; and in which C and D are end groups which, independently of one another, may be A or B. The end groups may be identical or different and are independent of the preparation process.

Examples of hydrophilic groups are polyethylene oxides, poly(1,3-dioxolane), copolymers of polyethylene oxide or poly(1,3-dioxolane), poly(2-methyl-2-oxazoline), poly(glycidyltrimethylammonium chloride), polymethylene oxide.

Examples of hydrophobic groups are polyesters in which the hydrophobic part is a steric barrier $\geq 50$ Å, preferably $\geq 75$ Å, in particular $\geq 100$ Å. The polyesters are derived from components such as 2-hydroxybutanoic acid, 3-hydroxybutanoic acid, 4-hydroxybutanoic acid, 2-hydroxycaproic acid, 10-hydrodecanoic acid, 12-hydroxydodecanoic acid, 16-hydroxyhexadecanoic acid, 2-hydroxyisobutanoic acid, 2-(4-hydroxyphenoxy)propionic acid, 4-hydroxyphenylpyruvic acid, 12-hydroxystearic acid, 2-hydroxyvaleric acid, polylactones from caprolactone and butyrolactone, polylactams from caprolactam, polyurethanes and polyisobutylenes.

The linear block copolymers contain both hydrophilic units and hydrophobic units. The block polymers have a molecular weight above 1 000 and a length of the hydrophobic moiety of $\geq 50$ Å calculated according to the law of cosines. These sizes are calculated for the extended configuration, taking into consideration the bond lengths and angles given in the literature. The preparation of these units is generally known. Preparation processes are, for example, condensation reaction of hydroxy acid, condensations of polyols, such as diols, with polycarboxylic acids, such as dicarboxylic acids. Also suitable is the polymerization of lactones and lactams, and the reaction of polyols with polyisocyanates. Hydrophobic polymer units are reacted with the hydrophilic units, as generally known, for example by condensation reaction and coupling reaction. The preparation of such block copolymers is described, for example, in U.S. Pat. No. 4,203,877, to which reference is expressly made. The proportion of linear block copolymers is preferably 20–100% by weight of the total amount of surface-active substance used.

Suitable surface-active substances are also the emulsifiers customarily used for water-in-oil emulsions, for example $C_{12}$–$C_{18}$-sorbitan fatty acid esters, esters of hydroxystearic acid and $C_{12}$–$C_{30}$-fatty alcohols, mono- and diesters of $C_{12}$–$C_{18}$-fatty acids and glycerol or polyglycerol, condensates of ethylene oxide and propylene glycols, oxypropenylated/oxyethylenated $C_{12}$–$C_{20}$-fatty alcohols, polycyclic alcohols, such as sterols, aliphatic alcohols with a high molecular weight, such as lanolin, mixtures of oxypropylenylated/polyglycerylated alcohols and magnesium isostearate, succinic esters of polyoxyethylated or polyoxypropylenated fatty alcohols, the lanolates and stearates of magnesium, calcium, lithium, zinc and aluminum, optionally as a mixture with hydrogenated lanolin, lanolin alcohol, or stearic acid or stearyl alcohol.

Emulsifiers of the Span® series (ICI Americas, Inc.) have proven particularly advantageous. These are cyclized sorbitol, sometimes polyesterified with a fatty acid, where the base structure can also be substituted by further radicals known from surface-active compounds, for example by polyoxyethylene. Examples which may be mentioned are the sorbitan esters with lauric, palmitic, stearic and oleic acid, such as Span 80 (sorbitan monooleate) and Span 60 (sorbitan monostearate).

In a preferred embodiment, oxypropylenated/oxyethylenated $C_{12}$–$C_{20}$-fatty alcohols are used as mixing component with further surface-active substances. These fatty alcohols usually have 3 to 12 ethylene oxide or propylene oxide units.

Preference is given to using $C_{12}$–$C_{18}$-sorbitan fatty acid esters as emulsifier. These can be used individually, in their mixtures and/or as mixtures with other abovementioned types of emulsifier. The proportion of sorbitan fatty acid esters is preferably 20–100% by weight of the total amount of surface-active substance used.

In a preferred embodiment, a mixture of surface-active substances comprising the above-defined linear block copolymers and $C_{12}$–$C_{18}$-sorbitan fatty acid esters is chosen.

Particularly preferably, a mixture of surface-active substances comprising the linear block copolymers $C_{12}$–$C_{18}$-sorbitan fatty acid esters and oxypropenylated/oxyethylenated $C_{12}$–$C_{20}$-fatty alcohols are chosen.

Preference is given to those mixtures comprising 20 to 95% by weight, in particular 30 to 75% by weight, of linear block copolymer and 5 to 80% by weight, in particular 25 to 70% by weight, of $C_{12}$–$C_{18}$-sorbitan fatty acid esters, based on the total amount of surface-active substance. The proportion of oxypropylenated/oxyethylenated $C_{12}$–$C_{20}$-fatty alcohol is preferably 0 to 20% by weight.

Particular preference is given to mixtures of surface-active substances comprising essentially 40 to 60% by weight of linear block copolymer, 30 to 50% by weight of $C_{12}$–$C_{18}$-sorbitan fatty acid esters and 2 to 10% by weight of oxypropylenated/oxy-ethylenated $C_{12}$–$C_{20}$-fatty alcohols, based on the total amount of surface-active substance.

The optimum amount of surface-active substance is influenced firstly by the surface-active substance itself, and secondly by the reaction temperature, the desired microcapsule size and the wall materials. The optimally required amount can be readily determined by simple serial experiments. The surface-active substance is generally used in an amount of from 0.01 to 10% by weight, preferably 0.05 to 5% by weight and in particular 0.1 to 2% by weight, based on the hydrophobic phase.

To prepare the microcapsules according to the invention, according to a preferred embodiment, a solution of water-soluble organic substance and OH- or $NH_2$-carrying reactant in the hydrophilic solvent can be added to the hydrophobic solvent. With the help of the surface-active substance, a stable emulsion is prepared with stirring. According to a likewise preferred variant, the water-soluble organic substances and the reactant are added only to the stable emulsion or during the emulsifying step. The isocyanate can then be metered in to such an emulsion. Generally, this starts the interfacial polyaddition or condensation and thus the formation of the wall.

The interface reaction can proceed, for example, at temperatures in the range from −3 to +70° C., but preference is given to working at 0 to 25° C.

Depending on the size of the capsules to be prepared, the nucleating material is dispersed in a known manner. For the preparation of large capsules, dispersion using effective stirrers, in particular propeller or impeller stirrers, suffices. Small capsules, particularly if the size is to be less than 50 µm, require homogenizing or dispersing machines, it being possible for these devices to be provided with or without forced-flow equipment.

The homogenization can also be carried out using ultrasound (Branson Sonifier II 450). For homogenization by means of ultrasound, suitable equipment is, for example, that described in GB 2250930 and U.S. Pat. No. 5,108,654.

The capsule size can be controlled via the speed of the dispersion apparatus/homogenization apparatus and/or using the concentration of the protective colloid or via the molecular weight thereof, i.e. via the viscosity of the aqueous continuous phase within certain limits. In this connection, as the speed increases up to a limiting speed, the size of the dispersed particles decreases.

In this connection, it is important that the dispersion devices are used at the start of capsule formation. In the case of continuously operating devices with forced-flow, it is advantageous to pass the emulsion through the shear field a number of times.

Using the process according to the invention, it is possible to prepare microcapsule dispersions with a content of from 5 to 50% by weight of microcapsules. The microcapsules are individual capsules. If suitable conditions are chosen during the dispersion it is possible to prepare capsules with an average particle size in the range from 0.5 to 50 µm and above. Preference is given to capsules with an average particle size of from 0.5 to 50 µm, in particular up to 30 µm. The average particle diameter is the number-average particle diameter, determined by quasielastic, dynamic light scattering. It is usually determined using a Coulter N4 Plus particle analyzer from Coulter Scientific Instruments. The size distribution of the capsules is particularly advantageously very narrow.

The microcapsule dispersions according to the invention can be incorporated into cosmetic compositions in a known manner. Incorporation into the cosmetic composition takes place by the procedures customary for this purpose, usually by stirring and homogenizing into the other constituents of the cosmetic composition.

Examples of cosmetic compositions which are formulated as decorative cosmetic composition are compositions for the treatment of facial skin, in particular in the eye area, such as kohl pencils, eyeliner pencils, eyebrow pencils, eyeshadows, cream blusher, powder blusher, foundation, make-up, e.g. stage make-up, lipsticks.

In the case of cosmetic compositions which consist exclusively of oils or fats, in particular those which have a solid form, e.g. pencils, such as kohl pencils, eyeliner pencils, eyebrow pencils, stick stage make-up, lipsticks and the like, and in the case of powder or fine powder cosmetic compositions, such as eyeshadows and cream blusher or loose powder blusher, preference is given to using microcapsule dispersions.

The amount of microcapsules in the cosmetic composition is governed primarily by the desired color impression which the decorative cosmetic composition is to have. Depending on the nature of the cosmetic composition and the desired color impression, the content of microcapsules in the cosmetic composition is in the range from 0.1 to 50% by weight, based on the total weight of the cosmetic composition.

EXAMPLE 1

A solution of 1.5 g of Span® 80 (sorbitan monooleate), 0.3 g of Cremophor® A6 [75% by weight of ceteareth-6

(ethoxylated cetyl alcohol), 25% by weight of stearyl alcohol, BASF] and 2.1 g of Arlacel® P135 (PEG-30 dipolyhydroxystearate, Atlas Chemie) in 860 g of Miglyol® (decanoyl/octanoyl glyceride; Hüls) 812 was introduced into a cylindrical 2 l stirred vessel. A dispersing apparatus (Turrax 45 N, from Jahnke & Kunkel) was used to prepare a water-in-oil emulsion by adding a solution of 6.7 g of ethylenediamine and 4 g of Cochenille Red A (E124; C.I. 162 55) in 80 g of water at a rotary speed of 6 000 rpm. The resulting emulsion was cooled to 2° C. in an ice bath at a stirrer speed of 1 000 rpm. With ice cooling, a solution of 23 g of Basonat® LR 8528 (polyfunctional tolylene diisocyanat adduct, 75% strength by weight in ethyl acetate; BASF) in 300 g of Miglyol was added at the same stirring speed over the course of 300 min. When the addition was complete, the dispersion was heated to room temperature and stirred for a further 180 min. The resulting dispersion was red-milky and, according to microscopic assessment, comprised individual capsules of predominantly 1 to 5 $\mu$m in diameter. The viscosity was 47.5 mPas and the solids content was 11% by weight.

The viscosities were measured in accordance with ISO 3219 (DIN 53019) using a Physica MC20 viscometer in measurement system 21 at a shear speed of 100 s$^{-1}$ and a temperature of 23° C. The capsule diameter was determined optically at 400× magnification using a microscope from Leitz (Diaplan 101/107).

EXAMPLE 2

A microcapsule dispersion was prepared analogously to example 1, the dye used being 4 g of Reactive Red 120. The resulting dispersion was red-milky and, according to microscopic assessment, comprised individual capsules of predominantly 1 to 5 $\mu$m in diameter. The viscosity was 43.9 mPas and the solids content was 11% by weight.

EXAMPLE 3

A microcapsule dispersion was prepared analogously to example 1, the dye used being 4 g of Reactive Red 2. The resulting dispersion was red-milky and, according to microscopic assessment, comprised individual capsules of predominantly 1 to 5 $\mu$m in diameter. The viscosity was 45.2 mPas and the solids content was 11% by weight.

EXAMPLE 4

Analogous to example 1, the aqueous solution used being a mixture of 64 g of H$_2$O and 16 g of ethanol. The resulting dispersion was red-milky and, according to microscopic assessment, comprised individual capsules of predominantly 1 to 5 $\mu$m in diameter. The viscosity was 50.2 mPas and the solids content was 11% by weight.

We claim:

1. A microcapsule dispersion comprising microcapsules having a capsule core comprising water-soluble dyes, and a capsule coating which essentially consists of polyurethane and/or polyurea, in a hydrophobic solvent which consists of 50 to 100% by weight of glycerol ester oils and 0 to 50% by weight of solvents miscible with glycerol ester oils.

2. A microcapsule dispersion as claimed in claim 1, wherein the capsule coatings essentially consist of reaction products of NH$_2$ group-carrying reactants with di- and/or polyisocyanates.

3. A microcapsule dispersion as claimed in claim 1 or 2, wherein the hydrophobic solvent are glycerol ester oils.

4. A microcapsule dispersion as claimed in claim 1, wherein the capsule core comprises water as hydrophilic solvent.

5. A process for the preparation of a microcapsule dispersion as in claim 1, which comprises preparing an emulsion of the hydrophilic solvent in the hydrophobic solvent using a surface-active substance, where the hydrophilic phase comprises the water-soluble dyes and the OH or NH$_2$ group-carrying reactants which react with di- and/or polyisocyanate groups, and adding di- and/or polyisocyanates to the emulsion.

6. A process as claimed in claim 5, wherein the surface-active substance used is a linear block copolymer with a hydrophobic structural unit with a length of more than 5 nm (50 Å), which is defined by the following formula:

$$C_w\text{-}(B\text{-}A\text{-}B_y)_x\text{-}D_z$$

in which A is a hydrophilic structural unit which has a solubility in water at 25° C. of 1% or more, has a molar mass of from 200 to 50 000, and is chosen such that it is bonded covalently to B; B is a hydrophobic structural unit which has a molar mass of from 300 to 60 000, a solubility in water at 25° C. of less than 1% and can be bonded covalently to A;

C and D are end groups which may be A or B and the same group or different groups;

w is 0 or 1;

x is 1 or an integer >1;

y is 0 or 1, and z is 0 or 1.

7. A process as claimed in claim 6, wherein the linear block copolymer is a 12-hydroxystearic acid block copolymer.

8. A process according to claim 5, wherein the surface-active substance used is C$_{12}$–C$_{18}$-sorbitan fatty acid ester.

9. A process as claimed in claim 5, wherein the surface-active substance used is a combination comprising C$_{12}$–C$_{18}$-sorbitan fatty acid esters and linear block copolymers with a hydrophobic structural unit with a length of more than 5 nm (50 Å), which is defined by the following formula:

$$C_w\text{-}(B\text{-}A\text{-}B_y)_x\text{-}D_z$$

in which A is a hydrophilic structural unit which has a solubility in water at 25° C. of 1% or more, has a molar mass of from 200 to 50 000, and is chosen such that it is bonded covalently to B; B is a hydrophobic structural unit which has a molar mass of from 300 to 60 000, a solubility in water at 25° C. of less than 1% and can be bonded covalently to A;

C and D are end groups which may be A or B and the same group or different groups;

w is 0 or 1;

x is 1 or an integer >1;

y is 0 or 1, and z is 0 or 1.

* * * * *